(12) United States Patent
Pasumansky et al.

(10) Patent No.: US 7,937,401 B2
(45) Date of Patent: May 3, 2011

(54) MULTIDIMENSIONAL DATABASE QUERY EXTENSION SYSTEMS AND METHODS

(75) Inventors: Mosha Pasumansky, Redmond, WA (US); Irina G. Gorbach, Bellevue, WA (US); Alexander Gourkov Balikov, Redmond, WA (US); Alexander Berger, Sammamish, WA (US); Marius Dumitru, Issaquah, WA (US); Thomas P. Conlon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/116,924

(22) Filed: Apr. 28, 2005

(65) Prior Publication Data

US 2006/0020933 A1 Jan. 26, 2006

Related U.S. Application Data

(60) Provisional application No. 60/586,541, filed on Jul. 9, 2004.

(51) Int. Cl.
*G06F 17/30* (2006.01)
(52) U.S. Cl. ......... 707/759; 707/758; 707/760; 707/957
(58) Field of Classification Search .............. 707/3, 758, 707/759, 760, 957
See application file for complete search history.

(56) References Cited

U.S. PATENT DOCUMENTS

| 5,937,410 | A | 8/1999 | Shen | |
| 6,205,447 | B1 | 3/2001 | Malloy | |
| 6,233,583 | B1 | 5/2001 | Hoth | |
| 6,377,934 | B1 | 4/2002 | Chen et al. | |
| 6,434,557 | B1 | 8/2002 | Egilsson et al. | |
| 6,473,750 | B1 * | 10/2002 | Petculescu et al. | 707/3 |
| 6,651,055 | B1 * | 11/2003 | Kilmer et al. | 707/3 |
| 7,062,479 | B2 * | 6/2006 | Edmunds et al. | 707/1 |
| 2002/0116389 | A1 | 8/2002 | Chen et al. | |
| 2003/0208468 | A1 | 11/2003 | McNab et al. | |
| 2003/0225736 | A1 | 12/2003 | Bakalash et al. | |
| 2004/0044671 | A1 | 3/2004 | Yoshimura et al. | |
| 2004/0123048 | A1 | 6/2004 | Mullins et al. | |
| 2004/0181518 | A1 * | 9/2004 | Mayo et al. | 707/3 |
| 2004/0193567 | A1 | 9/2004 | Dettinger et al. | |
| 2005/0049831 | A1 | 3/2005 | Lilly | |
| 2005/0071737 | A1 | 3/2005 | Adendorff et al. | |
| 2005/0216831 | A1 | 9/2005 | Guzik et al. | |
| 2005/0228818 | A1 | 10/2005 | Murthy et al. | |
| 2005/0256896 | A1 | 11/2005 | Pfeifer et al. | |
| 2005/0283459 | A1 * | 12/2005 | MacLennan et al. | 707/1 |
| 2006/0010164 | A1 | 1/2006 | Netz | |
| 2006/0020619 | A1 | 1/2006 | Netz | |

OTHER PUBLICATIONS

Article entitled "Expressions (MDX)" by Microsoft dated Sep. 2007.*

(Continued)

*Primary Examiner* — Mahesh H Dwivedi
(74) *Attorney, Agent, or Firm* — Workman Nydegger

(57) ABSTRACT

The subject invention pertains to the integration of an object model and a multidimensional database query language such as MDX. In particular, multidimensional declarative query language entities can be exposed through objects in an object model. The object model enables generation and employment of procedural language functions, routines, or procedures that interact with multidimensional database data. This effectively provides an extension for multidimensional query languages. For example, procedures can be stored and invoked from a declarative language query. Furthermore, the object model disclosed herein can expose a context object to enable conditional procedures based on the context of execution.

16 Claims, 12 Drawing Sheets

OTHER PUBLICATIONS

Article entitled "Using MDX and ADOMD to Access Microsoft OLAP Data" by Youness dated 2000.*

Article entitled "Introducing the SQL Server 'MDX in Analysis Services' Series", dated Dec. 2, 2002, by Pearson.*

SQL Server Accelerator for BI Overview. http://www.microsoft.com/sql/prodinfo/previousversions/ssabi/overview. mspx. Jun. 24, 2003, Last accessed Mar. 27, 2006. 4 pages.

MSDN Library, SQL Server 2000, Analysis Services (Analysis Services SQL Server). http://msdn.microsoft.com/library/en-us/olapdmad/aggettingstart_80xj.asp?frame=true. 2006 Microsoft Corporation. Last accessed Mar. 27, 2006. pp. 1-101.

MSDN Library, SQL Server 2000, Analysis Services (Analysis Services SQL Server). http://msdn.microsoft.com/library/en-us/olapdmad/aggettingstart_80xj.asp?frame=true. 2006 Microsoft Corporation. Last accessed Mar. 27, 2006. pp. 2-230.

MSDN Library, SQL Server 2000, Analysis Services (Analysis Services SQL Server). http://msdn.microsoft.com/library/en-us/olapdmad/aggettingstart_80xj.asp?frame=true. 2006 Microsoft Corporation. Last accessed Mar. 27, 2006. pp. 231-330.

MSDN Library, SQL Server 2000, Analysis Services (Analysis Services SQL Server). http://msdn.microsoft.com/library/en-us/olapdmad/aggettingstart_80xj.asp?frame=true. 2006 Microsoft Corporation. Last accessed Mar. 27, 2006. pp. 331-493.

Microsoft BI Accelerator Overview, Chapter 1, published: Jul. 10, 2002, 17 pages plus coversheet www.microsoft.com/sul/prodinfo/perviousversions/ssabi/ch1overview.mspx.

Adam Shapiro, "Analysis Services: Choosing Dimension Types in SQL Server 2000 Analysis Services", Microsoft SQL 2000 Technical Articles, Analysis Services: Choosing Dimension Types in SQL Server 2000 Analysis Services, Published: Jul. 2000, 18 pages.

OA Dated Jul. 11, 2008 for U.S. Appl. No. 11/074,508, 31 pages.
OA Dated Mar. 2, 2009 for U.S. Appl. No. 11/074,508, 50 pages.
OA Dated Dec. 29, 2008 for U.S. Appl. No. 11/050,130, 29 pages.
OA Dated Jul. 1, 2008 for U.S. Appl. No. 11/050,130, 22 pages.
Office Action dated May 17, 2007 cited in U.S. Appl. No. 11/050,130.
Office Action dated Nov. 1, 2007 cited in U.S. Appl. No. 11/050,130.
Office Action dated Oct. 1, 2009 cited in U.S. Appl. No. 11/050,130.
Office Action dated May 9, 2007 cited in U.S. Appl. No. 11/074,508.
Office Action dated Oct. 17, 2007 cited in U.S. Appl. No. 11/074,508.
Office Action dated Jan. 29, 2008 cited in U.S. Appl. No. 11/074,508.
Office Action dated Nov. 9, 2009 cited in U.S. Appl. No. 11/074,508.
Notice of Allowance dated Feb. 22, 2010 cited in U.S. Appl. No. 11/050,130.

* cited by examiner

MULTIDIMENSIONAL DATABASE QUERY EXTENSION SYSTEMS AND METHODS

CROSS-REFERENCE TO RELATED APPLICATIONS

This application claims the benefit of U.S. Provisional Application Ser. No. 60/586,541, filed Jul. 9, 2004, entitled "Systems and Methods to Analyze Database Data," the entirety of which is incorporated herein by reference.

TECHNICAL FIELD

The subject invention relates generally to databases and more particularly toward multidimensional database query systems and methods

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually in multidimensional database systems, data is represented as cubes with a plurality of dimensions and measures, rather than relational tables with rows and columns. A cube includes groups of data such as three or more dimensions and one or more measures. Dimensions are a cube attribute that contains data of a similar type. Each dimension has a hierarchy of levels or categories of aggregated data. Accordingly, data can be viewed at different levels of detail. Measures represent real values, which are to be analyzed. The multidimensional model is optimized to deal with large amounts of data. In particular, it allows users execute complex queries on a data cube. OLAP is almost synonymous with multidimensional databases.

OLAP is a key element in a data warehouse system. OLAP describes category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. HOLAP (Hybrid OLAP) is an amalgam of both MOLAP and ROLAP.

Multidimensional databases and other databases modeled as multidimensional employ a multidimensional query language such as MDX (MultiDimensional eXpressions) to retrieve and interact with data. More specifically, data can be retrieved utilizing the query language to define or describe specifically the data to be retrieved (i.e., declarative language), for example employing select, where and from clauses. Subsequently, an execution engine receives the query definition and returns the requested data.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns an object model and extension of a multidimensional query language including but not limited to MDX. The object model exposes query language objects to facilitate support of object-oriented procedural programs. Thus, programmers are able to employ procedural code against a multidimensional database, for example employing such languages as C#, C++, Java, and the like. Extending multidimensional database query languages to support both declarative and procedure code expands the power of a query language. Such increased power can enable users to easily tailor multidimensional queries and associated functionality to their own business model and analytical needs, among other things.

According to an aspect of the invention, a computer program system for interacting with multidimensional databases and data formats is disclosed. The system can include an object model that exposes multidimensional query language objects, a receiver component that receives procedural code based on the object model as well as a compilation component that compiles the received code into a computer executable format.

In accordance with another aspect of the invention, the disclosed object model can include a context object. The context object enables a procedure to capture the current context during the execution of a query and ultimately utilize it. The context object can include but is not limited to such properties identifying the current cube, the current database, the pass number, and the current server. The context can be employed to enable generation of conditional code that depends of the context of execution.

According to yet another aspect of the invention, procedural language procedures, routines, or functions can be stored, for example one a server, and accessed via calls invoking such procedures from a multidimensional query. Consequently, the subject invention also provides systems and methods to support stored procedures.

According to an aspect of the invention, a deployment system and method are provided. The deployment system includes a development component for specifying a procedure and a compiler component that compiles the procedure and stores the compiled code (e.g., binary file, dll . . . ) to a data store such as one associated with a server or more particularly an OLAP server.

In accordance with yet another aspect of the invention, query processing systems and methods disclosed. These systems and methods provide mechanisms and means to query multidimensional data utilizing both declarative and procedural query statements alone or in combination.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
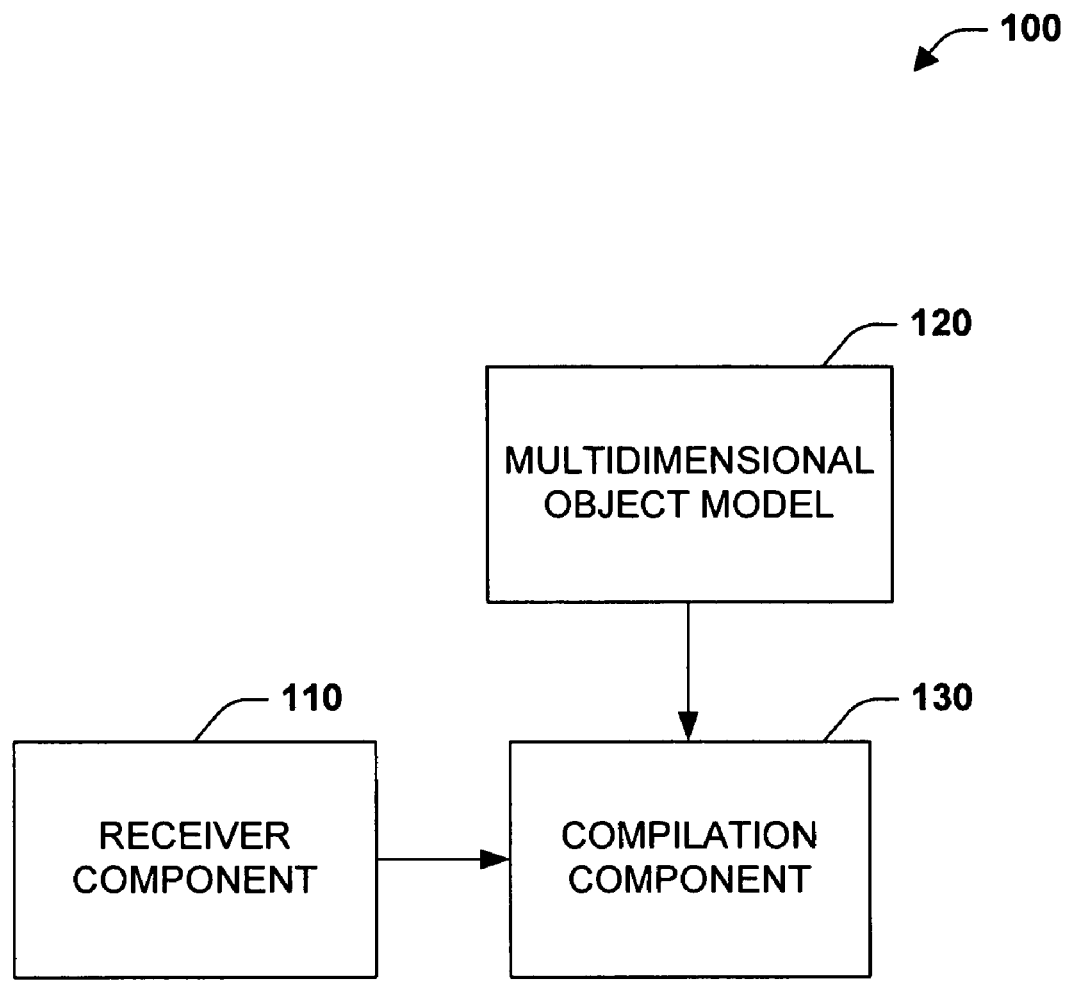
FIG. 1 is a block diagram of a programming system for interaction with multidimensional data in accordance with an aspect of the subject invention.

Turning initially to FIG. 1, a programmatic system 100 for interaction with multidimensional data is depicted in accordance with an aspect of the subject invention. System 100 includes a receiver component 110, a multidimensional object model 120 and a compilation component 130. Receiver component 110 receives source code in an object-oriented procedural programming language alone or in combination with a declarative programming language. In accordance with an aspect of the invention, the source code received by receiver component 110 pertains to interaction with multidimensional data. Multidimensional data includes multidimensional database data formats. In particular, multidimensional data is organized logically in cubes with a plurality of dimensions, levels members, and measures, among other things. Accordingly, code component can receive source code in procedural languages including but not limited to C#, Java, and Visual Basic, alone or in combination with declarative languages such as MDX (Multidimensional Expressions). MDX is a declarative language specifically designed to make access of multidimensional data from cubes, dimensions, and the like both easy and intuitive. Multidimensional object model 120 (also referred to herein simply as object model) encapsulates and exposes objects and functionality of a declarative query language, such as MDX, to object oriented procedural languages such as but not limited to C#, Visual Basic, C++, and Java. For instance, object model 120 can include a collection of classes defining functions and/or procedures provided by a declarative language and relationships amongst the classes. The source code obtained by code receiver component 110 can be passed or transmitted via data packets to compilation component 130. Compilation component 130 converts the high-level source code into computer-readable machine code. This compiled code can then be stored and/or executed by a computer (as defined infra) thereby transforming the computer into a specialized machine. Object model 120 can be compiled together with or linked to the source code thus enabling specification and execution of multidimensional functions and procedures. Of course, the compiler component 130 can also load, link, or otherwise interact with other objects models, libraries and the like associated with one or more procedure programming languages that the compilation component 130 can compile.

Figure 2:
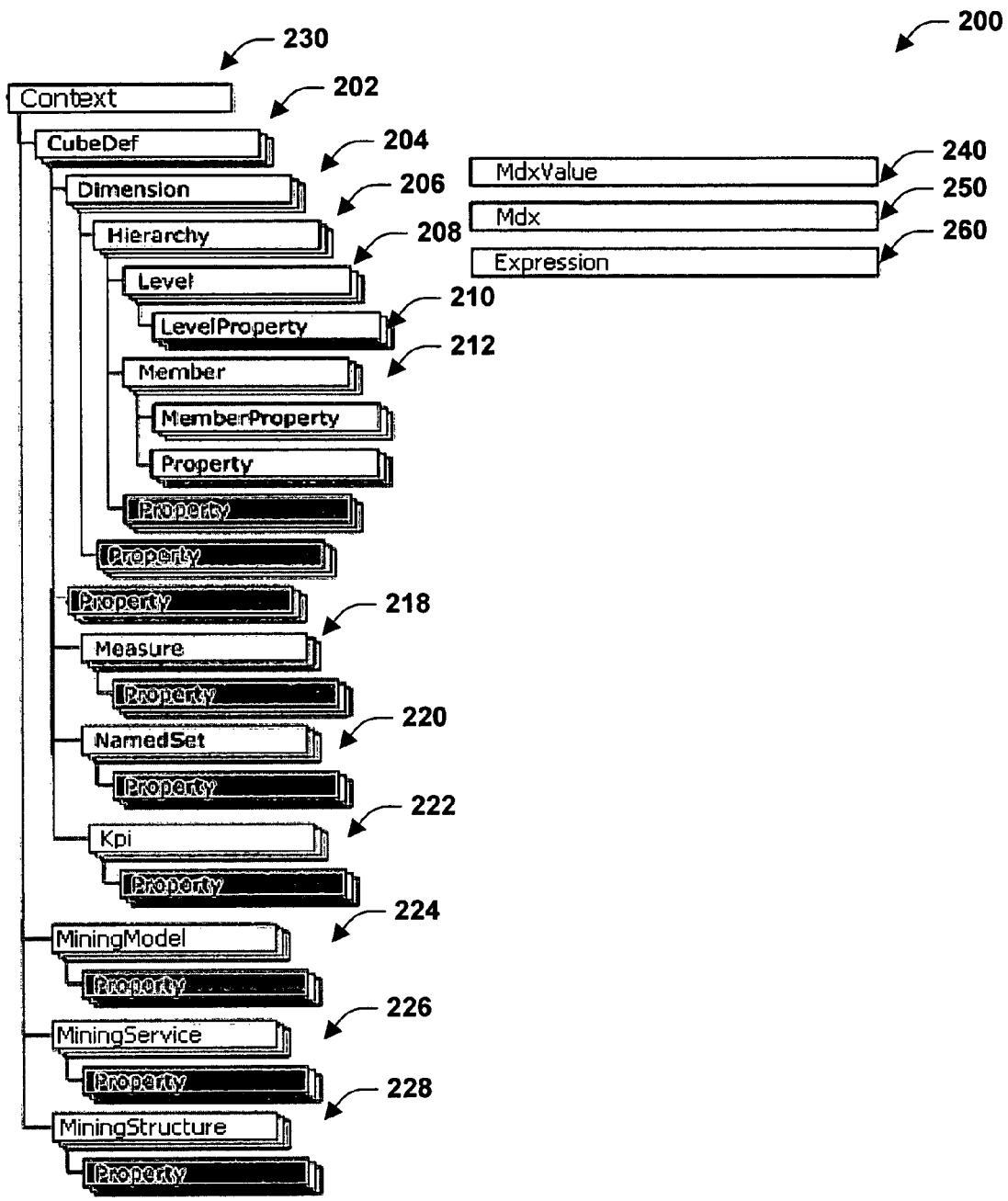
FIG. 2 is an exemplary object model diagram in accordance with an aspect of the subject invention.

FIG. 2 is an exemplary object model diagram 200 in accordance with an aspect of the subject invention. In particular, the objects of object model 200 correspond to MDX objects, methods, or functions thereby exposing them for use. Procedures, routines or functions, including stored procedures described infra, can be programmed utilizing object model 200. Each object can include properties and in some cases methods associated therewith. Furthermore, the hierarchical structure can define collections of objects. The CubeDef object 202 can include properties including but not limited to name, description, last updated, last processed, caption and type (e.g., cube, dimension, unknown). CubeDef object 202 can also include collections of dimensions, measures, named-sets, KPIs (Key Performance Indicators) and properties. These properties may be accessed via an Item property where the item is available by integer index or by Name and a Count property. CubDef object 202 can have methods associated with it such as GetSchemaObject( ), Enumeration: Dimension, Hierarchy, Level, Member, and Measure.

Dimension object 204 can have properties such as name, unique name, description, parent cube, dimension type, write enabled, and caption. Name can be a string identify for the dimension object name. Unique name can be a string providing a unique identifier for the object. Description can be a string providing a description of the object. The parent cube property can be utilized to identify the parent cube for the dimension object. Dimension type can be an enumerator providing the dimension type. Write enabled can be a Boolean value specifying whether the dimension can be written. Caption can be a string providing a caption for the current locale. The illustrated hierarchy also provides that the dimension object 204 can include hierarchies, attribute hierarchies, and properties.

Hierarchy object 206 can include properties such as name, unique name for object, description, parent dimension, default member, display folder, caption, and hierarchy origin. Default member can be a string unique name for the default member of the hierarchy. Display folder can be a string identifying a display folder for the hierarchy. The hierarchy identifies that the hierarchy object 206 can include collections such as levels and properties.

Level object 208 can include properties such as name, unique name, description, parent hierarchy, level type, member count, level number and caption. Member count is the exact count of members on the level. Level number can be an integer specifying the distance between the level and the root of the hierarchy. Level objects 208 can also include collections of level properties for the level as well as properties of the collection. Level objects 208 can further include a number of methods. For example, level objects 208 can include a GetMembers method with various parameters to retrieve levels or dimension members.

Member object 212 can include properties such as name, unique name, description, parent level, parent, caption, level depth, child count, drilled down, level depth, level name, and type. The member object can also include collections member properties where every member property of the member is exposed and properties.

Measure object 218 can also include a myriad of properties such as name, unique value, caption, display folder, description, numeric precision, numeric scale, units, expression, and parent cube. It should further be appreciated that the remaining objects, named set 220, KPI 222, mining model 224, mining service 226, and mining structure 228 can all include one or more of a plurality of properties, collections, and methods associated with MDX.

MDXValue object 240 indicates that the object model supports MDX values. The MDXValue object has no public properties, methods or collections. It is the return type from MDX functions and can be converted or cast to other types for further manipulation in stored procedure code, for instance.

MDX object 250 simply indicates the names space for using MDX functions. This removes the need to precede every function name with the MDXFunction by declaring it as a namespace. The following example uses the cross join function to create a set object:

```
MDX.Set tset1;
MDX.Set tset2;
MDX.Set tset3;
tset1 =
Database(0).Cube(0).Dimension(0).Hierarchy(0).Level(0).Members;
tset1 =
Database(0).Cube(0).Dimension(1).Hierarchy(0).Level(0).Members;
tset3 = MDX.MDX.Crossjoin(tset1, tset2);
```

Expression object 260 indicates that MDX value expressions are supported. For example:

```
MDX.Member X;
X = X.Parent;
X = X.Lead(3);
X = X.FirstChild;
```

Each such expression will be treated as a method off the member object, which returns the same object/collection/etc. as the corresponding MDX function.

Object model 200 can also include a context object 230. The context object 230 enables a procedure to obtain current context during the execution of a query and make use of it. The context object 230 need not be explicitly passed or returned by a procedure. It can be available during execution of the procedure. Furthermore, it can be a read only value(s). The context object 230 can include a plurality of properties. For example, the context object 230 can include properties including but not limited to current cube, current database name, pass, and current server id. The current cube property can identify the cube for current query context. Current database name can be a property that identifies, as the name suggests, the current database. The pass property can be an integer that specifies the pass number for the current context. A pass can correspond to a stage of computation or calculation. The pass number can start at zero and be incremented for each calculation pass. The current server id property can be a string that specifies or identifies the current server or instance name.

One significant power of the context object 230 in the object model 200 can be with respect to a current tuple property. Through the current property, for example, one can reach the current member property in every dimension. The tuple type can include a set of members, and from each member there can be a member object (as previously described). From that member object, one can find all relevant properties such as its level, hierarchy, dimension, member properties, and so forth. Accordingly, code can be written or specified to act conditionally depending on, for instance, the member from a certain dimension being analyzed.

Consider the following pseudo-code example where a procedure is designed to take code path conditional based on whether TimeDimension's CurrentMember is the DefaultMember for the hierarchy.

```
MDX.Cub cub;
MDX.Tuple CurTup;
MDX.Member DefMemb;
MDX.Member memb;
MDX.Dimension TimeDim;
```

```
MDX.Level YrLev;
cub = MDX.Context.CurrentCube;
CurTup = MDX.Context.CurrentTuple;
TimeDim = cub.Dimensions("[Time]");
YrLev = cub.Dimension("[Time]").Hierarchies(0).Levels("Year");
TimeMemb1997 =
cub.Dimensions("[Time]").Hierarchies(0).
Levels("[Year]").Members("[1997]");
TimeMemb1998 =
Cub.Dimensions("[Time]").Hierarchies(0).
Levels("[Year]").Members("[1998]");
For each memb in CurTup {
If memb.ParentLevel.ParentHierarchy.ParentDimension = TimeDim
    {
    Switch (MDXFunction.Ancestor(memb, YrLev)
        {
        Case TimeMemb 1997:
          DoSomething( );
          break;
        Case TimeMemb 1998:
          DoSomething( );
          break;
        Default:
          DoDefault( );
          break;
        }
    }
}
```

Furthermore, it should be noted that a stored procedure might wish to take a code path conditional on a pass number. For instance:

```
If (MDX.Context.Pass > 5) {...}
```

Figure 3:
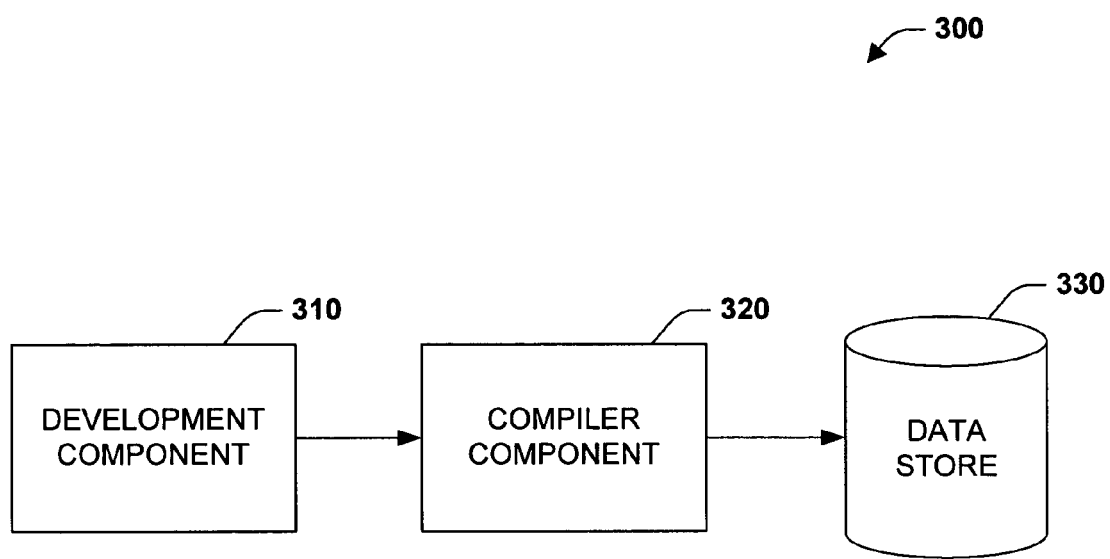
FIG. 3 is a block diagram of a procedure deployment system in accordance with an aspect of the subject invention.

Turning to FIG. 3, a procedure deployment system 300 is depicted in accordance with an aspect of the subject invention. System 300 includes development component 310, compiler component 320, and data store 320. Development component 310 facilitates generation of procedural language procedures, routines, or functions. Accordingly, development component 310 can be a source code editor. Users can employ development component 310 to produce one or more routines or extensions utilizing a procedural language (e.g., C, C#, Java . . . ) and an object model that includes objects supporting a multidimensional database query type system such as MDX. Furthermore, it should be noted that the routines could employ the context object (described supra) to enable generation of conditional extension code that depends on the context in which the extension is executing. Compiler component 320 can receive or retrieve a produced function, compile such function, and generate an object file or an executable. The compiler component 320 can subsequently save or upload the compiled extension to data store 320. In accordance with an aspect of the invention, database 320 can be part of a server such as an OLAP server. Storage of the compiled function to the database 320 makes the extension available for employment by later queries. Finally, it should be appreciated that while illustrated separately, development component 310 and compiler component 320 can be incorporated into a single system such as an integrated development environment (IDE).

Figure 4:
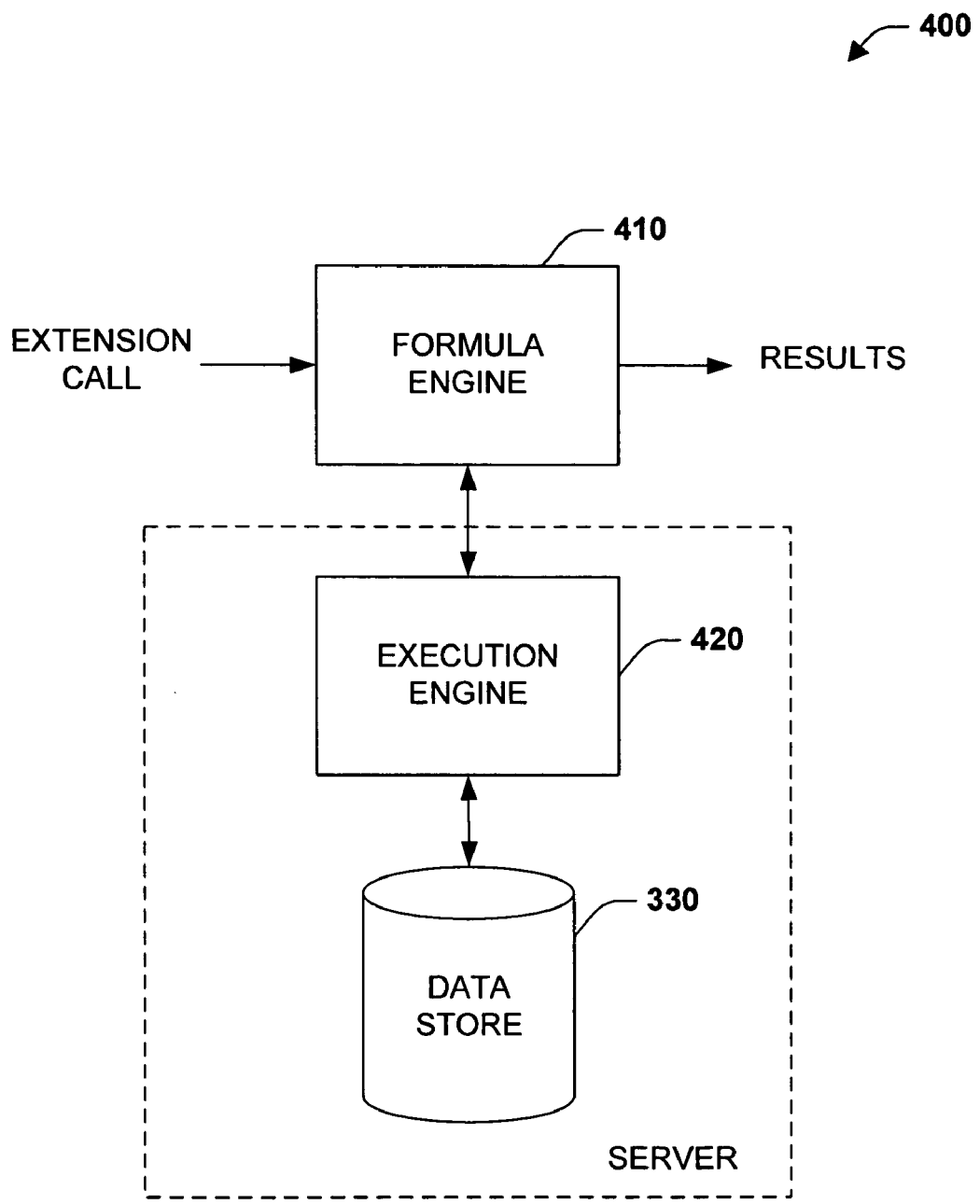
FIG. 4 is a block diagram of an extension process system in accordance with an aspect of the subject invention.

FIG. 4 depicts an extension process system 400 in accordance with an aspect of the subject invention. System 400 includes formula engine 410, execution engine 420, and data store 330. Formula engine 410 receives or retrieves identification of or reference to an extension component comprising a function or routine specified in a procedural language. For example, the receiver component 410 can receive a call to such extension, for example my_function(args). The formula engine 410 can pass the extension call to the execution engine 420. Upon receipt of an extension or function call, the execution engine 420 can locate the compiled extension on the data store 330. Subsequently, the extension is executed and the results are returned to the formula engine 410. At that point, the formula engine can format the results, if necessary, and output them to the calling entity. It should be appreciated that both the execution engine 420 and the data store 330 can be part of or operate in a server system or server process space such as an OLAP server.

Figure 5:
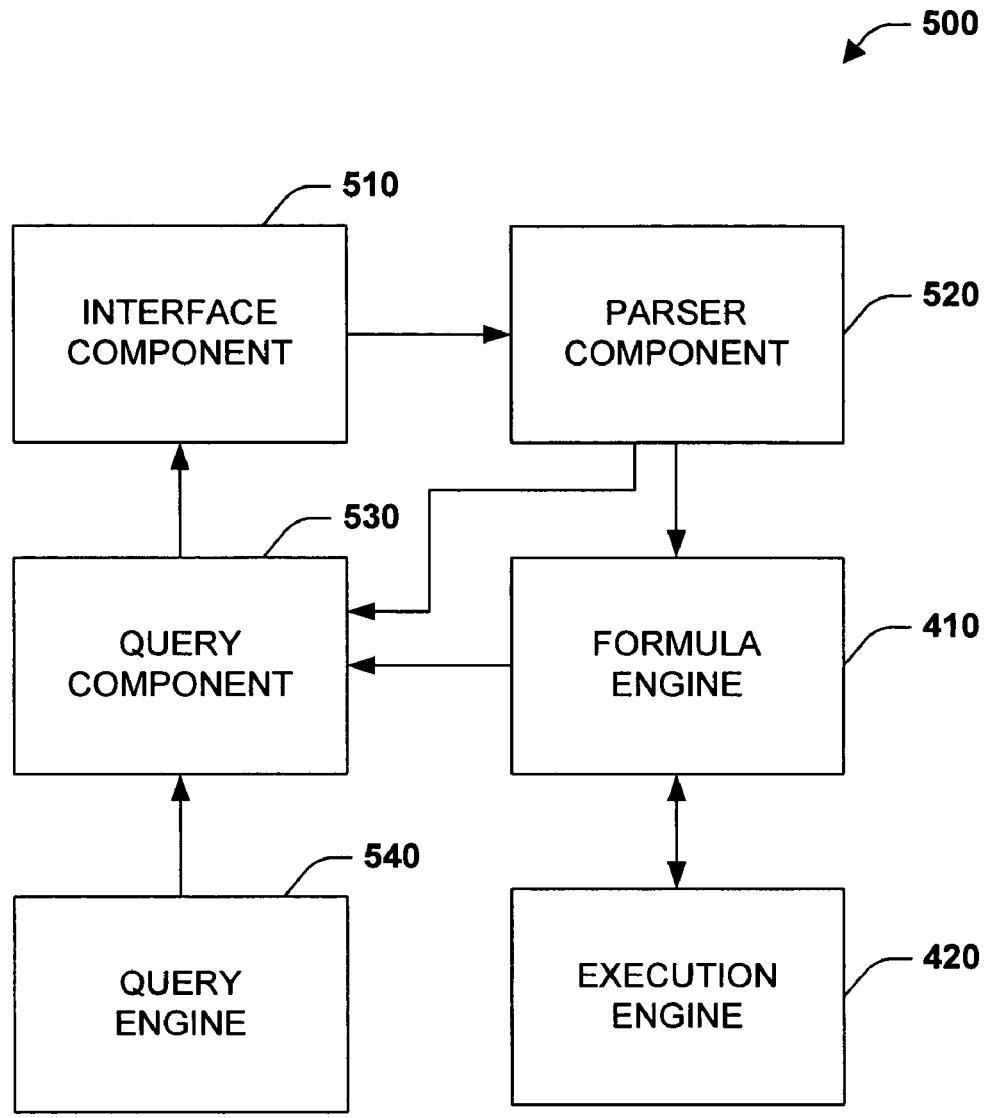
FIG. 5 is a block diagram of a query process system in accordance with an aspect of the subject invention.

FIG. 5 illustrates a query process system 500 in accordance with an aspect of the subject invention. System 500 can include interface component 510, parser component 520, formula engine 410, execution engine 420, query component 530, and query engine 540. Interface component 510 is operable to receive queries and return results. In particular, interface component 510 can receive declarative queries that include procedural extensions. Interface component 510 is communicatively coupled to parser component 520. Parser component 520 receives the query from the interface component and performs parsing operations thereon. The parser component can therefore identify an extension within a query. The extension call or reference can be passed to the formula engine 410. The declarative portions of the query can be passed to the query component 530. The formula engine 410 passes the extension or function call to the execution engine 420. The execution engine 420 can locate the extension, execute the extension, and return results to the formula engine 410. It should be appreciated that in accordance with an aspect of the subject invention the extension can execute within a server process space and return a result object type supported by the query language type system. For example, the type can be a sets, tuples, members, hierarchies, levels, etc. for an MDX program. The result or result object can then be passed to the formula engine 410. The formula engine 410 can perform some optional formatting of the data and subsequently pass the result to the query component 530. The query component can generate a declarative query based on the declarative query components received from the parser component 520 and the results extension from formula engine 530. This assembled query can then be passed to a query engine 540, which can query a database (not shown) and return results to query component 530. The results can then be transmitted from the query component 530 to the interface 510 and then back to the entity providing the query.

To further clarify the operation of system 500 consider the following example: Assume that the interface component received the MDX query "Select my_stored_procedure(args) on 0 from Sales." The parser component 520 can receive this query and identify the extension component "my_stored-_procedure(args)." This extension can be provided to the formula component 410, which sends it the execution engine 420. Execution engine 420 can located and then execute the procedure based on the arguments provided. Thereafter, the result or result object, for instance the MDX "Set" object, can be return to the formula component 410. The formula component 410 can then pass and the query component 530 can receive the result of the extension execution. A new declaratory query can then be generated by the query component 530 incorporating the extension result, "Select 'result object' on 0 from Sales." Query results can then be passed back to the query component 530, which passes it to the interface component 510, which can ultimately output the result to the requesting entity.

Furthermore, it should be noted that the objects in the object model can be passed as parameters to store procedures or extensions as well as returned as results therefrom. Thus in the case of MDX syntax, invocation of an extension or stored procedure does not differ from invocation of any other MDX function which takes MDX objects as parameters and returns one or more MDX objects as a result.

As with all system figures, it should be appreciated that one or more components illustrated and/or described as separate and distinct components can be combined into one or a lesser number of components providing the same aggregate functionality. Figures are illustrated herein to facilitated clarity and understanding. However, other combinations, aggregations or even additional components are contemplated and within the scope of the subject invention. With respect to system 500, the query component 530 and the formula engine 410, as well as the query execution engine 540 and the execution engine 420 can be combined such that there is one component that passes a query including procedural calls or invocations and another component that executes the query and procedural calls.

Figure 6:
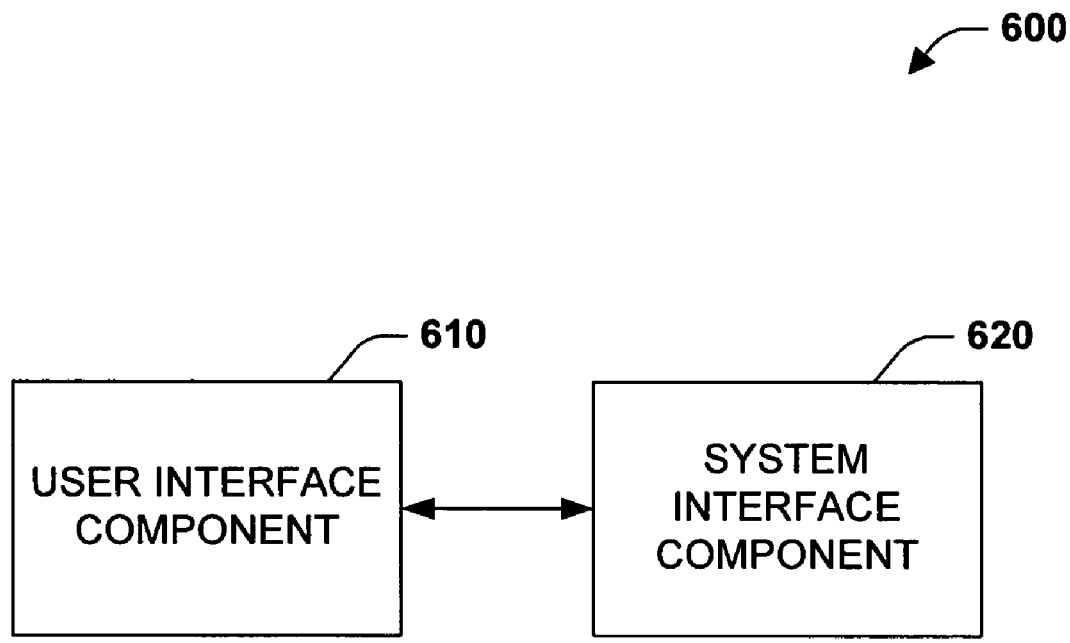
FIG. 6 is a block diagram of a multidimensional interface system in accordance with an aspect of the subject invention.

Turning to FIG. 6, a multidimensional database interaction system 600 is illustrated in accordance with an aspect of the subject invention. System 600 can include a set of two interfaces, namely user interface 610 and system interface component 620, to facilitate interaction with a multidimensional database system that process queries that include procedural routine calls or the like. User Interface component 610 receives multidimensional queries from users or other entities. In particular, interface component 610 can receive multidimensional declarative queries that include calls to procedural functions or routines. According to an aspect of the invention, the query can be an MDX query, for example "Select procedure(args) on 0 from Sales." System interface component 620 receives the multidimensional query from the user interface component 610 and returns the results of such a query. These results can be provided back to the user interface component 610. The user interface component 610 can then provide the results back to the query submitting entity. According to an aspect of the invention, user interface component 610 and system interface component 620 can be separate application programming interfaces or subcomponents for single application interface providing aggregate functionality.

In view of the exemplary systems described supra, methodologies that may be implemented in accordance with the present invention will be better appreciated with reference to the flow charts of FIGS. 7-10. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
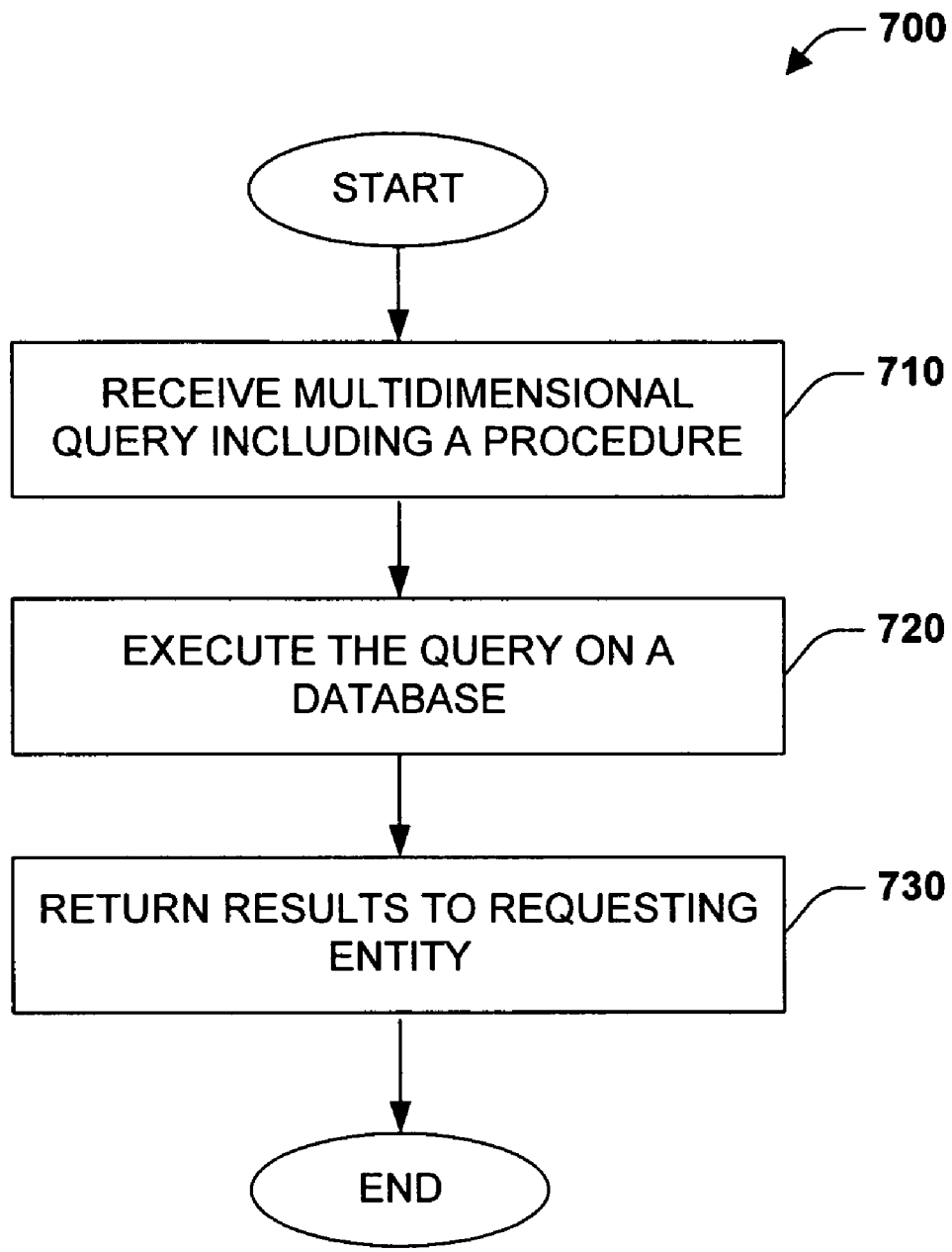
FIG. 7 is a flow chart diagram of a multidimensional query methodology in accordance with an aspect of the subject invention.

Turning to FIG. 7, a method of querying multidimensional data 700 is illustrated in accordance with an aspect of the subject invention. At 710, a query is received that includes a procedure or procedure call. Stated differently, rather than the being purely declarative, the query can include procedural elements such as routines, functions or references thereto. These procedural elements facilitate algorithmic manipulation of multidimensional entities (e.g., cubes, dimensions, members, sets, tuples . . . ) via objects. In particular, declarative query functionality for instance defined by MDX can be exposed to object-oriented procedural languages through an object model as described herein. According to one aspect of the invention, the object model can include a context object that can be employed to allow execution of conditional procedures or functions based on the context of execution. At 720, an execution engine can execute the received query on a database (e.g., relational, multidimensional, hybrid . . . ). According to an aspect of the invention, the execution engine can be tightly integrated with the object model thereby allowing efficient execution of one or both of declarative and procedural query statements. As will be described in the later sections, the queries can include calls to stored procedures, which the execution engine can invoke together with declarative statements. At 730, the results of the query can be returned to the requesting entity. For example, the results can be provided to another program for further calculation or interpretation or presented via display to one or more users.

Figure 8:
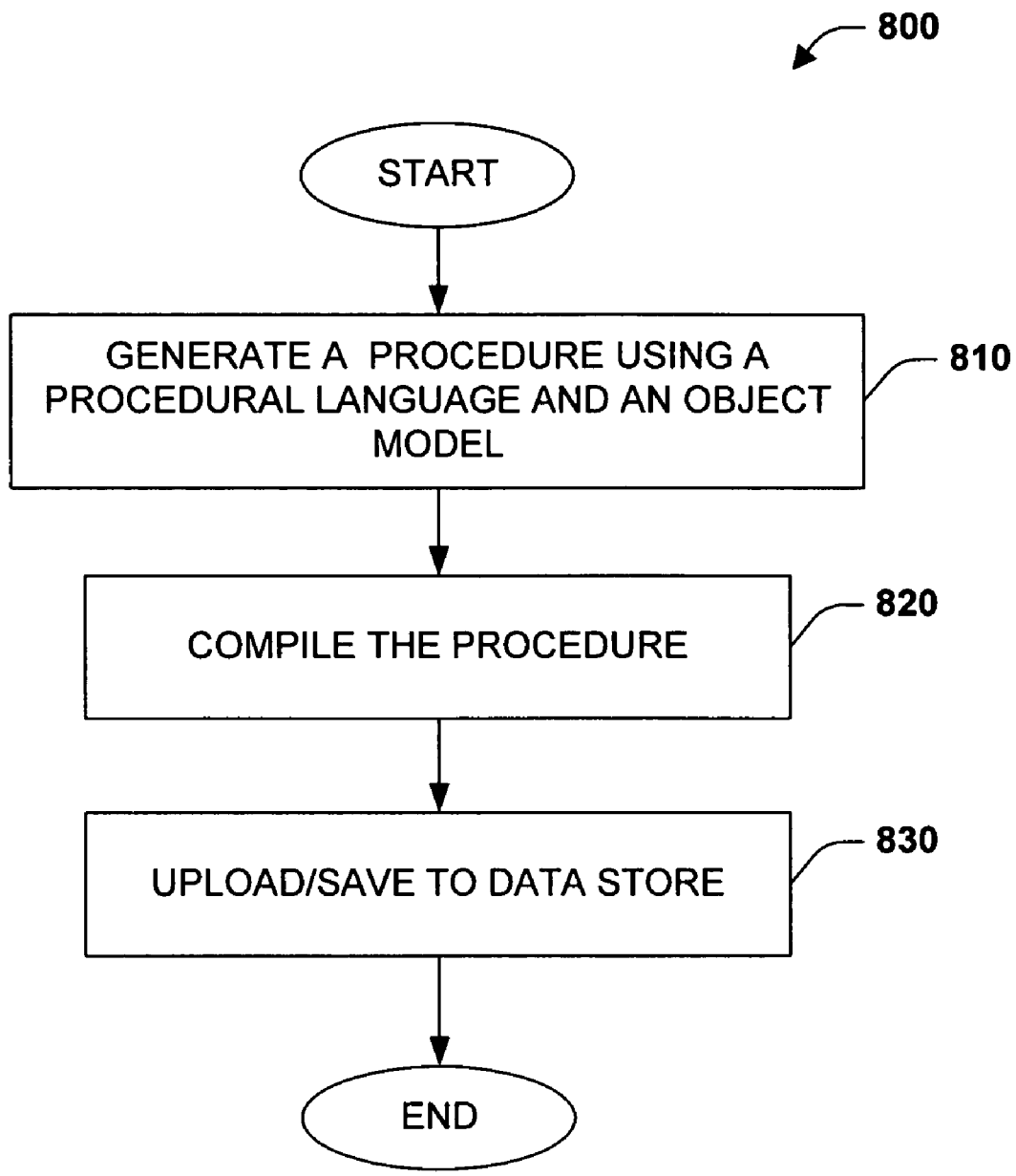
FIG. 8 is a flow chart diagram of a method of deploying procedures in accordance with an aspect of the subject invention.

FIG. 8 depicts a method 800 of deploying a procedure in accordance with an aspect of the subject invention. At 810, a procedure is generated. The procedure can be generated utilizing an object-oriented procedural language such as C# and an object model exposing multidimensional elements including but not limited to cubes, dimensions, members, measures, context, and properties thereof. Generation can be manual and/or with the aid of a code editor or design environment. At 820, the procedure is compiled. The procedure can be compiled into object code or a binary file such as a dynamic linked library (dll). The compiled procedure can then be uploaded or saved to a data store, at 830. According to an aspect of the invention, the data store can reside on a server such as an OLAP server.

Figure 9:
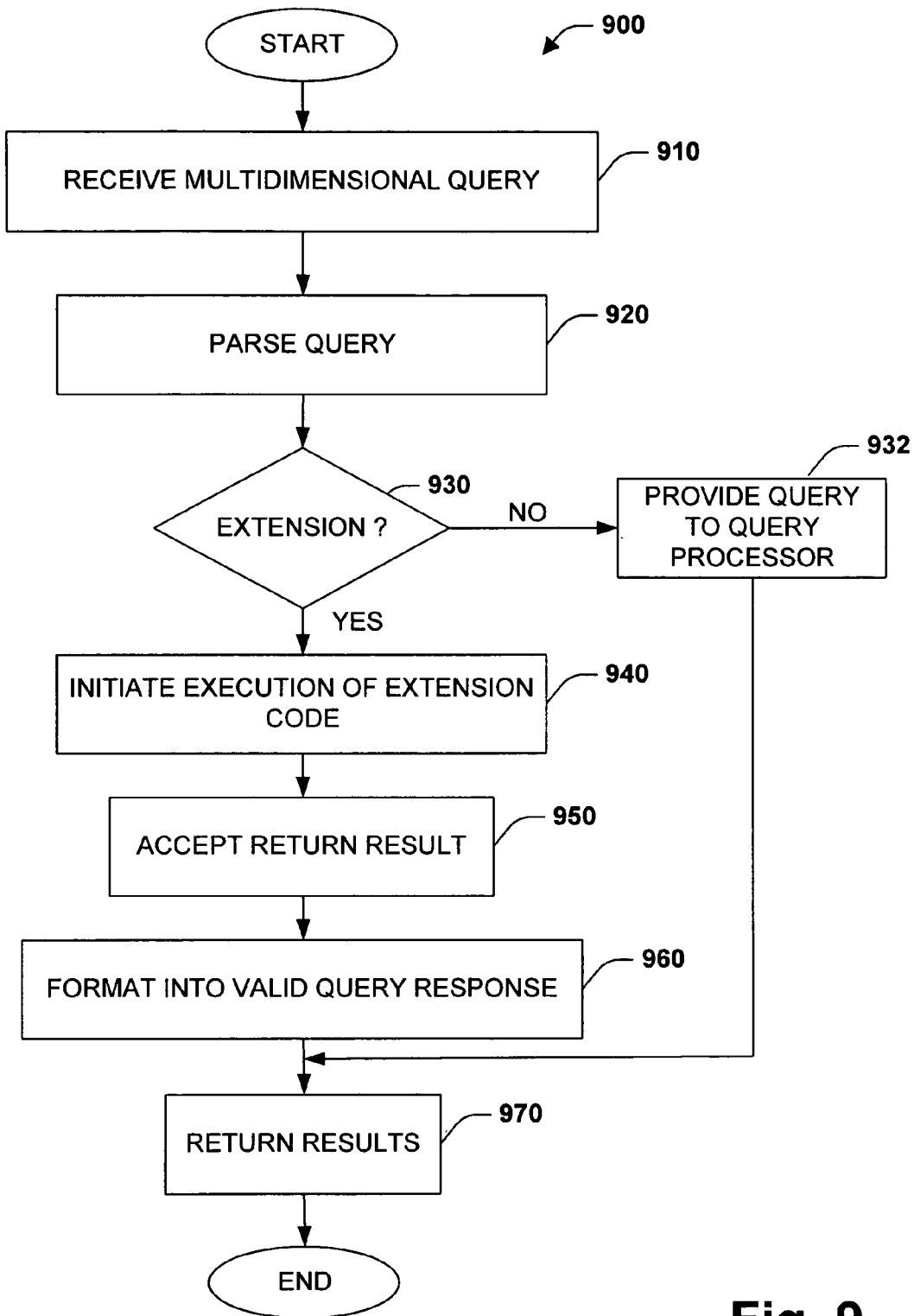
FIG. 9 is a flow chart diagram of a query processing methodology in accordance with an aspect of the subject invention.

FIG. 9 illustrates a query processing methodology 900 in accordance with an aspect of the subject invention. At 910, a multidimensional query is received. The query can include one of declaratory and procedural (i.e., extension) elements. At 920, the query is parsed. At 930, a determination is made as to whether the parsed query includes an extension. For example, the extension can be a call or invocation of a stored procedure. If no, then at 932 the standard declaratory query is provided to a query processor. Subsequently, the results are provided at 970. If the query includes an extension, then at 940 execution of the extension is initiated. Such execution can be performed on a server housing the stored procedure invoked. At 950, the return results are accepted. At 960, the returned results can be formatted or modified into a valid query response. Finally, at 970, the results are returned to the requesting entity.

Figure 10:
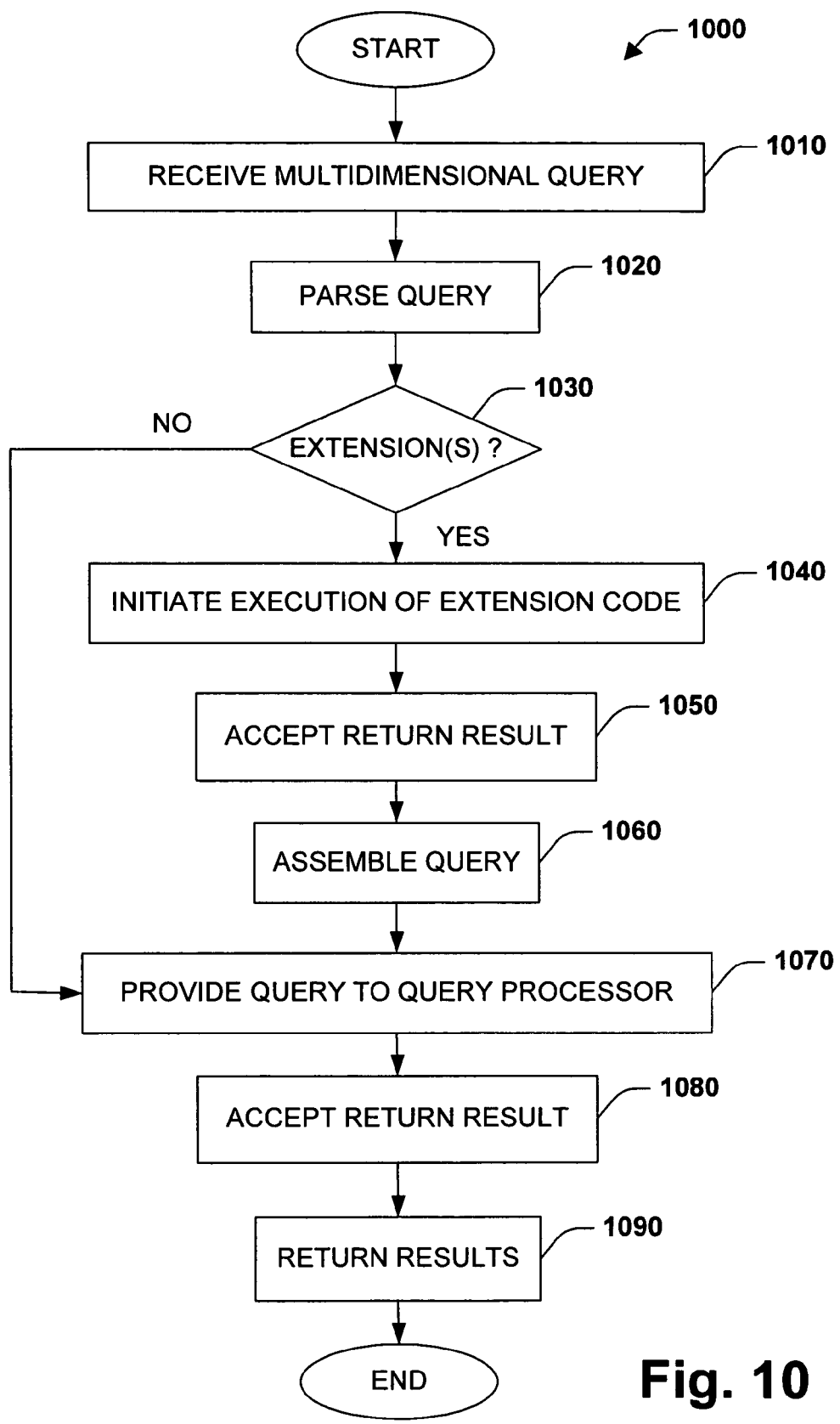
FIG. 10 is a flow chart diagram of a query processing methodology in accordance with an aspect of the subject invention.

FIG. 10 depicts a query methodology 1000 in accordance with an aspect of the subject invention. Query methodology 1000 can be employed to process simply declarative queries or declarative queries with embedded procedures or invocations. At 1110, a multidimensional query is received. The query can include declaratory as well as procedural elements. At 1120, the query is parsed into component parts. At 1130, a determination is made based on the parsed elements as to whether the query includes extensions or extension code. Extensions or extension code refers to procedural elements such as a stored procedure or function call. If at 1130 it is determined that the query does not include any extensions or procedural elements, then the method can proceed to 1070 where the standard declarative query is provided to the query processor. However, if, at 1130, it is determined that the query contains one or more extensions, then the method proceeds to 1040. At 1040, execution of the extension(s) is initiated. This can involve passing a reference to a procedure and its arguments to an execution component engine residing on a server. At 1050, results are accepted from the execution of the extension. At 1060, query is assembled. For example, the results of the execution of the extension replace the original position yield by the procedure call, for example. Accordingly, an executable query is generated incorporating the results of called functions or procedures. At 1070, the assembled query is provided to the query processor or engine for execution. The query processor executes the query on a data store and returns results. At 1080, the results are accepted from the query processor. At 1090, the results are returned to the querying entity.

Figure 11:
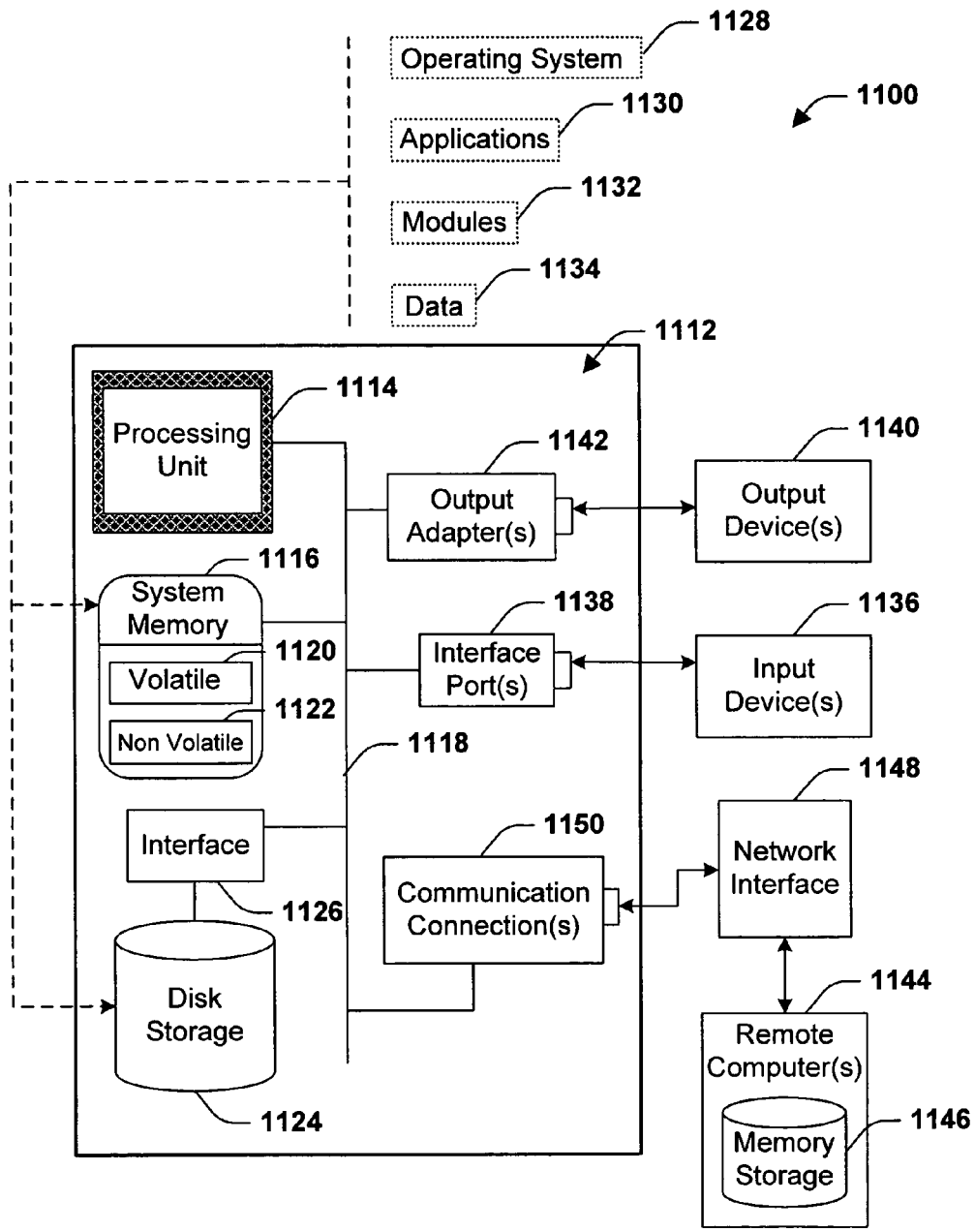
FIG. 11 is a schematic block diagram illustrating a suitable operating environment in accordance with an aspect of the present invention.
Figure 12:
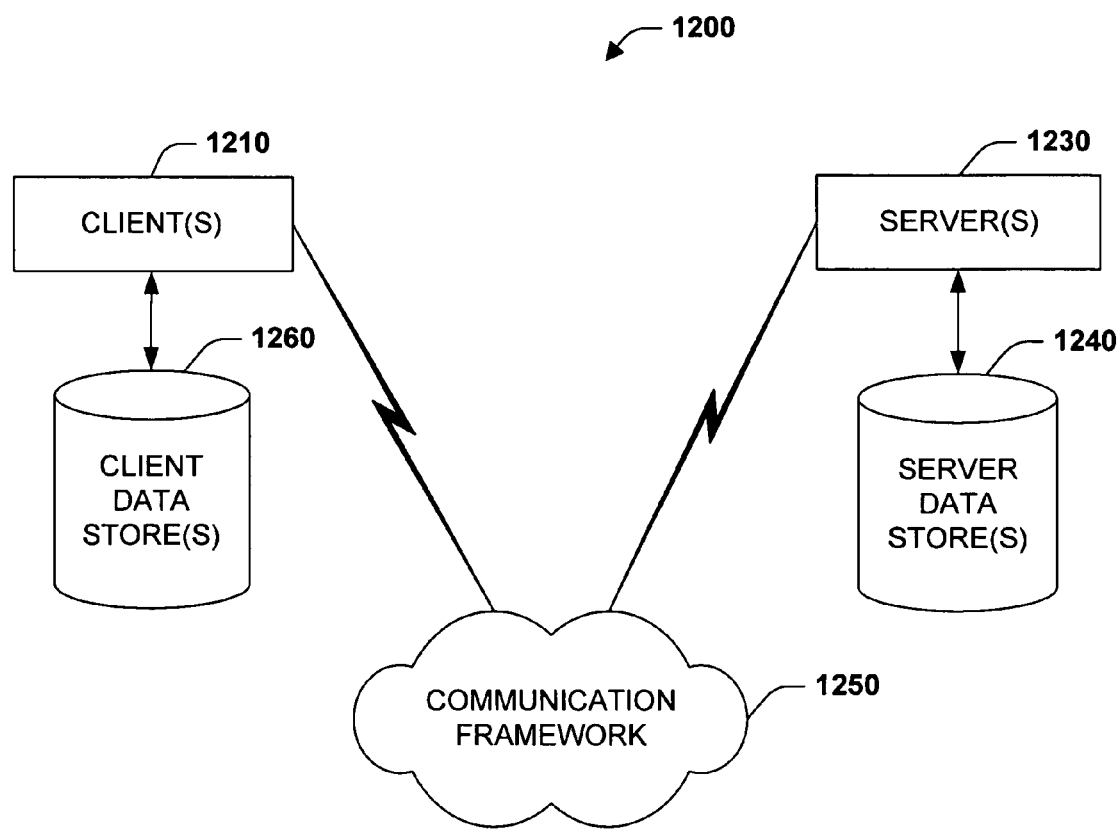
FIG. 12 is a schematic block diagram of a sample-computing environment with which the present invention can interact.

In order to provide a context for the various aspects of the invention, FIGS. 11 and 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/nonvolatile computer storage media. FIG. 11 illustrates, for example disk storage 1124. Disk storage 4124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The server(s) 1230 can house threads to perform transformations by employing the present invention, for example. One possible communication between a client 1210 and a server 1230 may be in the form of a data packet transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A computer programming system for interaction with multidimensional data comprising:
    a processor, wherein the processor stores and executes instructions for providing
    an object model that exposes multidimensional query language objects and functionality to an object oriented procedural language code, wherein the multidimensional query language objects include code extensions that support both declarative software code and user-defined software routines written in procedural code, such that the object model allows users to tailor multidimensional queries and the associated functionality to the user's business model, wherein the object model includes a context object that generates and executes at least one conditional software code procedure that depends on the current execution context, wherein the context object is not explicitly passed or returned by a procedure but is available during execution of the software code procedure, and wherein the context object includes a plurality of context properties including at least the following: a current cube property that identifies the cube for current query context, a current database name property that identifies the current database, a pass property that specifies the pass number for the current context wherein the pass corresponds to a stage of computation in the execution context, and a current server ID property that identifies the currently executing server's name;
    a receiver component that receives object oriented procedural language code based on the object model, the received code including the following:
        procedural calls to one or more of the multidimensional query language objects, wherein the procedural calls include calls to procedural language routines, functions or procedures that are written in one of a plurality of procedural programming languages, and wherein procedural calls facilitate algorithmic manipulation of multidimensional entities including cubes, dimensions, members, sets and tuples using objects of the object model; and
        declarative statements that define or describe specifically the data to be retrieved, wherein the declarative statements include select, where and from clauses; and
    a compilation component that compiles the received code into a computer executable machine code.

2. The system of claim 1, wherein the compilation component stores the compiled procedure to a data store.

3. The system of claim 2, further comprising an interface component that receives at least one query statement that includes at least one declarative statement and at least one procedural call.

4. The system of claim 3, further comprising a parse component to parse the at least one received query statement to facilitate identification of the at least one procedure call included within the at least one received query statement.

5. The system of claim 4, further comprising:
    a formula engine that receives the at least one procedure call from the parse component; and
    an execution engine that executes stored procedures associated with the respective at least one procedure call and returns results to the formula engine.

6. The system of claim 5, further comprising a query component that receives results from the formula engine, generates a query integrating results from the at least one procedure call with declarative aspects of the received query, provides the query to a query execution component, and returns results to the interface component.

7. A method of querying a multidimensional database comprising:
  receiving a multidimensional query statement specified in a multidimensional query language that includes multidimensional query language objects which include code extensions that support both declarative software code and user-defined software routines written in procedural code, such that the multidimensional query language objects allow users to tailor multidimensional queries to the user's business model, wherein the object model includes a context object that generates and executes at least one conditional software code procedure that depends on the current execution context, wherein the context object is not explicitly passed or returned by a procedure but is available during execution of the software code procedure, and wherein the context object includes a plurality of context properties including at least the following: a current cube property that identifies the cube for current query context, a current database name property that identifies the current database, a pass property that specifies the pass number for the current context wherein the pass corresponds to a stage of computation in the execution context, and a current server ID property that identifies the currently executing server's name, the received multidimensional query statement further including procedural calls to one or more of the multidimensional query language objects,
    wherein the procedural calls include calls to procedural language routines, functions or procedures that are written in one of a plurality of procedural programming languages,
    wherein procedural calls facilitate algorithmic manipulation of multidimensional entities including cubes, dimensions, members, sets and tuples using objects of the object model and declarative statements that define or describe specifically the data to be retrieved,
    wherein the declarative statements include select, where and from clauses, and
    wherein the multidimensional query statement includes a call to a procedure that is stored in a data store;
  executing the query against the database; and
  returning results of the query to a requesting entity.

8. The method of claim 7, further comprising generating the procedure utilizing an object-oriented procedural programming language and an object model exposing query language objects to the object-oriented procedural programming language.

9. The method of claim 8, wherein generating a procedure comprises creating a conditional procedure based on context of execution as provided by the context object.

10. The method of claim 8, further comprising compiling the procedure and storing the compiled procedure to the data store.

11. The method of claim 10, wherein executing the query comprises executing the stored procedure within a server process space.

12. The method of claim 11, further comprising receiving a result represented by a query language object.

13. The method of claim 12, further comprising assembling the return result into a valid query response.

14. The method of claim 7, receiving a query comprises receiving an multi-dimensional expression query language (MDX) query.

15. A computer readable medium having stored thereon computer executable instructions for carrying out the method of claim 7.

16. A computer apparatus for extending the MDX query language, comprising:
  a processor, wherein the processor stores and executes instructions for providing
  a multi-dimensional expression query language (MDX) object model that exposes MDX objects and MDX functionality to an object oriented procedural language code, wherein the MDX objects include code extensions that support both declarative software code and user-defined software routines written in procedural code, such that the MDX object model allows users to tailor MDX queries and the associated MDX functionality to the user's business model wherein the MDX object model includes a context object that generates and executes at least one conditional software code procedure that depends on the current execution context, wherein the context object is not explicitly passed or returned by a procedure but is available during execution of the software code procedure, and wherein the context object includes a plurality of context properties including at least the following: a current cube property that identifies the cube for current query context, a current database name property that identifies the current database, a pass property that specifies the pass number for the current context wherein the pass corresponds to a stage of computation in the execution context, and a current server ID property that identifies the currently executing server's name;
  a receiver component that receives object oriented procedural language code based on the MDX object model, the received code including the following:
    procedural calls to one or more of the MDX objects, wherein the procedural calls include calls to procedural language routines, functions or procedures that are written in one of a plurality of procedural programming languages, and wherein procedural calls facilitate algorithmic manipulation of multidimensional entities including cubes, dimensions, members, sets and tuples using objects of the MDX object model; and
    declarative statements that define or describe specifically the data to be retrieved, wherein the declarative statements include select, where and from clauses; and
  a compilation component that compiles the received code into a computer executable machine code.

* * * * *

UNITED STATES PATENT AND TRADEMARK OFFICE
CERTIFICATE OF CORRECTION

PATENT NO. : 7,937,401 B2  
APPLICATION NO. : 11/116924  
DATED : May 3, 2011  
INVENTOR(S) : Mosha Pasumansky et al.

Page 1 of 1

It is certified that error appears in the above-identified patent and that said Letters Patent is hereby corrected as shown below:

In column 16, line 24, in Claim 16, after "model" insert -- , --.

Signed and Sealed this  
Nineteenth Day of July, 2011

David J. Kappos  
*Director of the United States Patent and Trademark Office*